United States Patent
Ikeda et al.

[11] 3,936,136
[45] Feb. 3, 1976

[54] MULTILAYER ANTI-REFLECTION FILM FOR ULTRAVIOLET RAYS

[75] Inventors: Hideo Ikeda, Kamakura; Hideki Akasaka, Kawasaki, both of Japan

[73] Assignee: Nippon Kogaku K.K., Tokyo, Japan

[22] Filed: Nov. 19, 1973

[21] Appl. No.: 416,826

Related U.S. Application Data

[63] Continuation-in-part of Ser. No. 211,175, Dec. 23, 1971, abandoned.

[30] Foreign Application Priority Data

Dec. 29, 1970 Japan.................. 45-120942

[52] U.S. Cl..................................... 350/1; 350/164
[51] Int. Cl.²............................................. G02B 5/28
[58] Field of Search............... 350/1, 163–166; 117/33.3

[56] References Cited
UNITED STATES PATENTS
3,738,732  6/1973  Ikeda................... 350/164

OTHER PUBLICATIONS

Baymeister, *Journal of the Optical Society of America*, Vol. 52, No. 10, Oct. 1962, pp. 1149–1152.

*Primary Examiner*—Ronald J. Stern
*Attorney, Agent, or Firm*—Fitzpatrick, Cella, Harper & Scinto

[57] ABSTRACT

A three-layer anti-reflection film for ultraviolet range comprises a first layer having a refractive index $n_1$ determined so as to provide a great dispersion effect in the peripheral range, a second layer having a refractive index $n_2$, and a third layer having a refractive index $n_1$. The three layers are arranged symmetrically. The first and third layers are provided with an asymmetry so that an intended refractive index $n^*$ for the ultraviolet range from 200mµ to 400mµ may be obtained. The film has a predetermined optical thickness.

7 Claims, 16 Drawing Figures

(1) ZrO2+SiO2  (2) HfO2+SiO2  (3)(4) Sc2O3+SiO2

INVENTOR.

MULTILAYER ANTI-REFLECTION FILM FOR ULTRAVIOLET RAYS

This is a continuation-in-part of Application Ser. No. 211,175, filed Dec. 23, 1971 for "Multilayer Anti-Reflection Film For Ultraviolet Rays", now abandoned.

BACKGROUND OF THE INVENTION

1. Field of the Invention

This invention relates to a multilayer anti-reflection film for the ultraviolet range (200–400m$\mu$).

2. Description of the Prior Art

Figure 1:
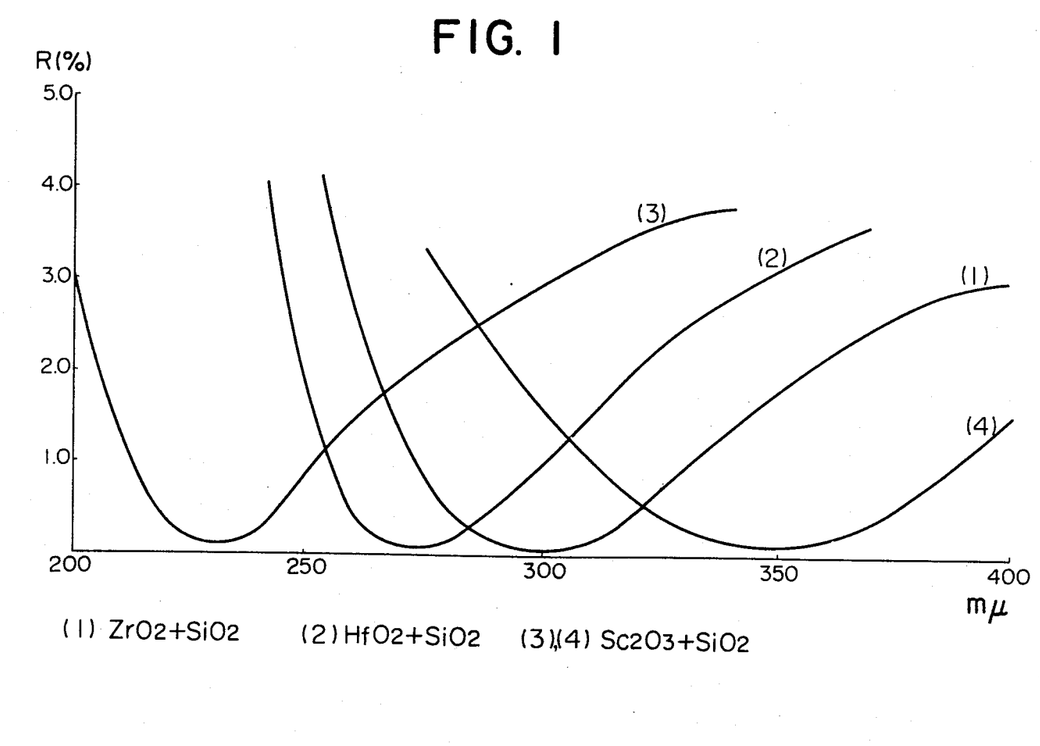
FIG. 1 is a graph illustrating the spectral characteristics of the two-layer anti-reflection film for the ultraviolet range according to O. A. Motovilov et al., the film comprising a substrate layer of rock crystal formed by using combinations (1) $ZrO_2 + SiO_2$, (2) $HfO + SiO_2$, (3) and (4) $Sc_2O_3 + SiO_2$.
Figure 2:
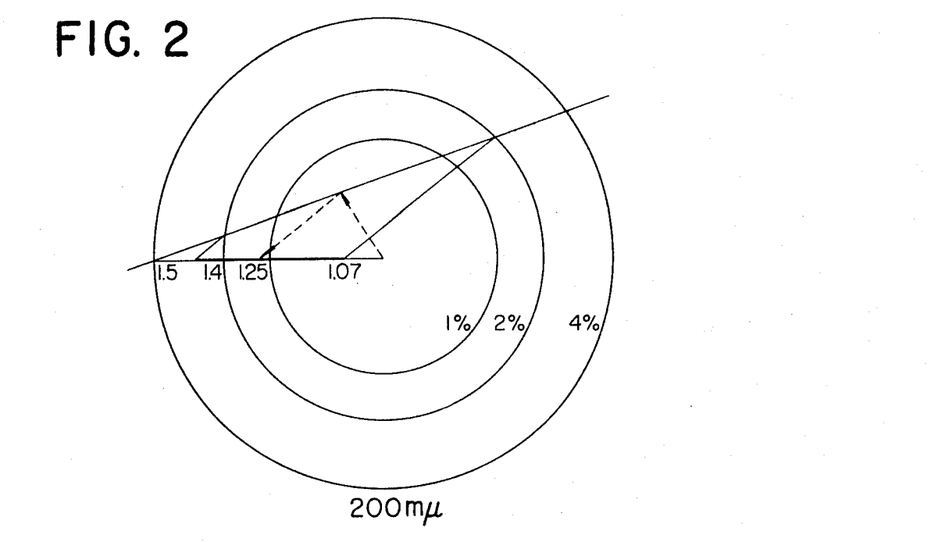
FIG. 2 is a vector diagram representing the reflection factor of a single-layer film with a thickness of $\lambda$ for a wavelength of 200 m$\mu$ when the center wavelength is 260 m$\mu$, wherein the thicker line represents the range of refractive index within which the reflection factor of the film becomes less than 2% when it is interposed between a substrate having a refractive index of 1.5 and air (whose refractive index is 1.0), and wherein the dashed lines denote the vector diagram for a refractive index of 1.25.

Unlike the well-known anti-reflection films intended for the visible range, the corresponding films for the ultraviolet range (200–400m$\mu$) have received little attention because of various limitations such as the limited availability of suubstances which are physico-chemically stable and transparent in the ultraviolet range, the manufacturing problem of controlling the thickness of the film, and the wider wavelength range of the ultraviolet range than the wavelength range of the visible range. The only known anti-reflection film for ultra-violet rays is that proposed by O. A. Motovilov (see FIG. 1 of the accompanying drawings). This film, however, cannot be expected to achieve the effect as an anti-reflection film for the full range of 200–400m$\mu$, since it basically employs a two-layer film of 2H.L. which is known as an anti-reflection film for the visible range, whereby the substances such as $ZrO_2$, $HfO_2$, $Sc_2O_3$, etc. used as substances of high refractive indices cause absorption to occur at the shorter wavelength side (below 260m$\mu$). At the same time, the absorption effect cannot be neglected in case of an optical system utilizing a plurality of reflection and refraction surfaces.

SUMMARY OF THE INVENTION

An object of the present invention is to provide an anti-reflection film which can fully achieve an anti-reflection effect throughout the entire wavelength range of 200–400m$\mu$ and which is physico-chemically stable and transparent to such range of light. The choosing of manufacturing techniques for constructing ultraviolet range anti-reflection films depends largely on the problems encountered in controlling the film thickness. More specifically, where the control of the film thickness effected by using ultraviolet range of measuring the reflection factor or the transmission factor for such range, difficulties are encountered as regards manufacturing of the optical system (especially, filter or the like) and photometric system used therefore. On the other hand, the reflection factor varies with variations in the optical thickness, and in the case of an optical film thickness $m\lambda/4$ ($m=1,2\ldots$), the reflection factor (or the transmission factor) reaches an extreme value irrespective of the refractive indices of the substances forming the film. Therefore, it has been observed that the optical thickness of the film should be controlled to $m\lambda v/4$ for the visible range so as to correspond to the optical thickness of $m\lambda u/2$ for the ultraviolet range, Thus, $$\frac{m\lambda_v}{4} = \frac{m\lambda_u}{4} \cdot \frac{\lambda_v}{\lambda_u} \quad (1)$$

$$\frac{\lambda_v}{\lambda_u} \approx 2 \quad (2)$$

where $\lambda_v$ represents the center wavelength in the visible range, and $\lambda_u$ the center wavelength in the ultraviolet range. Thus, at first, an optical film having a thickness of $m\lambda u/2$ ($m=1,2,\ldots$) becomes easier to realize. Then, the refractive index n, which is representative of the availability of such optical film as a single-layer anti-reflection film for the ultraviolet range (200–400 m$\mu$), is sought. The results obtained by the vector method for the various wavelengths of 200 m$\mu$, 250 m$\mu$, 350 m$\mu$ and 400 m$\mu$ are shown in FIGS. 2, 3, 4, 5 and 6. These results clearly show that suitable substances forming a layer with an optical thickness $\lambda$ and having refractive indices less than 1.3 and higher than 1.1 are effective to form an anti-reflection film for the other wavelengths other than the center wavelength. Unfortunately, however, it is hardly possible to obtain deposited (evaporated) substances which have the intended refractive indices and which are transparent to the ultraviolet range.

As a means of reproducing such refractive indices, the theory of equivalent film is known in the art. A symmetric multilayer film has a pronounced characteristic that it can be permuted by a single-layer film equally for each wavelength. The inventors have discovered the property of a three-layer film which is symmetrical only with respect to a film thickness, and has two outstanding basic features for utilizing such property. A three-layer film which is symmetrical with respect to the film thickness can be expressed by a Herpin matrix, as follows:

$$M = \begin{bmatrix} \cos G_1, & \frac{j}{n_1+\Delta_n}\sin G_1 \\ j(n_1+\Delta_n)\sin G_1, & \cos G_1 \end{bmatrix} \begin{bmatrix} \cos G_2, & \frac{j}{n_2}\sin G_2 \\ jn_2\sin G_2, & \cos G_2 \end{bmatrix}$$

$$\begin{bmatrix} \cos G_3, & \frac{j}{n_1}\sin G_3 \\ jn_1\sin G_3, & \cos G_3 \end{bmatrix} \quad (3)$$

where $G_1 = 2\pi \frac{(n_1+\Delta_n)d_1}{\lambda_s} \cdot \frac{\lambda_s}{\lambda}$, $G_2 = 2\pi \frac{n_2 d_2}{\lambda_s} \cdot \frac{\lambda_s}{\lambda}$, $G_3 = 2\pi \frac{n_1 d_3}{\lambda_s} \cdot \frac{\lambda_s}{\lambda}$ and $$(n_1 + \Delta n)d_1 = n_1 d_3 \quad (4)$$

$n_1, n_2$: refractive index of a layer;
$d_1, d_2, d_3$: physical thickness of a layer;
$(n_1 + \Delta n)d_1, n_2 d_2, n_1 d_3$: optical thickness of a layer;
$\Delta n$: difference between the index of the first layer and that of the third layer;
$\lambda$: arbitrary wavelength;
$\lambda_s$: center wavelength
$j$: imaginary number If $\Delta n >> n_1$, equation (3) becomes:

$$M = \begin{bmatrix} \frac{n_1}{n_1+\Delta n}, & 0 \\ 0, & \frac{n_1+\Delta n}{n_1} \end{bmatrix} \begin{bmatrix} \cos G_3, & \frac{j}{n_1}\sin G_3 \\ jn_1\sin G_3, & \cos G_3 \end{bmatrix}$$

$$\begin{bmatrix} \cos G_2, & \frac{j}{n_2}\sin G_2 \\ jn_2\sin G_2, & \cos G_2 \end{bmatrix} \begin{bmatrix} \cos G_3, & \frac{j}{n_1}\sin G_3 \\ jn_1\sin G_3, & \cos G_3 \end{bmatrix} \quad (5)$$

$$= \begin{bmatrix} \frac{n_1}{n_1 + \Delta n}, & 0 \\ 0, & \frac{n_1 + \Delta n}{n_1} \end{bmatrix} \begin{bmatrix} \cos\theta, & \frac{j}{n}\sin\theta \\ jN\sin\theta, & \cos\theta \end{bmatrix} \quad (6)$$

where
N : equivalent refractive index of the symmetrical three layers expressed above by the last three terms of Eq. (5) at arbitrary wavelength $\lambda$;

$$\theta : 2\pi \frac{ND}{\lambda_s} \cdot \frac{\lambda_s}{\lambda} ;$$

D : equivalent physical thickness of the symmetrical three-layers;
ND : equivalent optical thickness of the symmetrical three-layers;
Further, if $$\Delta ND = \frac{2nd_1}{\lambda_s} + \frac{nd_2}{\lambda_s} - \frac{ND}{\lambda_s}$$

$$\Delta ND = 2 - \frac{n_2}{n_1} + \frac{n_1}{n_2} \sin 2G_1 \sin G_2$$

$$N = n_1 \left[ \frac{n_1 n_2 \sin 2G_1 \cos G_2 + (n_2^2 \cos^2 G_1 - n_1^2 \sin^2 G_1)\sin G_2}{n_1 n_2 \sin 2G_1 \cos G_2 + (n_1^2 \cos^2 G_1 - n_2^2 \sin^2 G_1)\sin G_2} \right]^{1/2} \quad (8)$$

From equations (7) and (8) it will be seen that if a combination of layers $$\frac{\lambda_s}{4}, \frac{\lambda_s}{2} \text{ and } \frac{\lambda_s}{4}$$

is used, the equivalent refractive index N for a range containing and neighboring to the center wavelength (wave number 1) will become substantially equal to the refractive index $N(\lambda_s)$ for the center wavelength 1 and the equivalent optical thickness ND will become substantially equal to $2nd_1 + nd_2$.
Thus, we obtain
$$N(\lambda) \approx N(\lambda_s)$$

$$\frac{ND}{\lambda_s} \approx \frac{2nd_1}{\lambda_s} + \frac{nd_2}{\lambda_s} \quad (10)$$

From equations (9) and (10) it will be seen that in a range containing and neighboring to the center wavelength, the equivalent refractive index N is nearly equal to an equivalent refractive index $N(\lambda_s)$ of the central wavelength and the equivalent optical thickness ND is nearly equal to an actual optical thickness of a combination of the symmetrical three layers.

On the other hand, the equivalent refractive index N to the wavelength in the peripheral range of the ultraviolet region such as $350m\mu - 400m\mu$ and $200m\mu - 225m\mu$, in which the center or middle wavelength is not included, deviates substantially from $N(\lambda_s)$ and reaches a very great or small value. Therefore, the wavelength satisfying the equations (9) and (10) must be a value which sufficiently reduces the numerator of the equation (7) so that in the indexes $n_1$ and $n_2$ have the following relations:

$$\frac{n_1 d_1}{\lambda_s} = \frac{n_2 d_2}{\lambda_s} = \alpha$$

$$2n_1 d_1 + n_2 d_2 = \frac{m}{4}\lambda_s$$

$$(m = 1, 2, \ldots\ldots)$$

$$|\cos G| \simeq \frac{n_1}{n_1 + n_2}$$

$$2\frac{n_1 d_1}{\lambda_s} = \frac{n_2 d_2}{\lambda_s} = 2\alpha$$

C-
U-
Z,-

$$2n_1 d_1 + n_2 d_2 = \frac{m}{4}\lambda_s,$$

$$(m = 1, 2, \ldots\ldots)$$

(7)

$$|\cos G| \simeq \sqrt{\frac{n_1}{n_1 + n_2}}$$

and $$\frac{n_1 d_1}{\lambda_s} = \frac{2n_2 d_2}{\lambda_s} = \alpha$$

$$2n_1 d_1 + n_2 d_2 = \frac{m}{4}\lambda_s,$$

$$(m = 1, 2, \ldots\ldots)$$

then $|\cos G| \simeq \left[ \left\{ 1 + \left(\frac{n_2}{n_1 + n_2}\right)^2 \right\}^{1/2} - \frac{n_2}{n_1 + n_2} \right]$ where $$G = \pi 2\alpha \cdot \frac{\lambda s}{\lambda}$$

wherein $\lambda$ is a specific wavelength in the far peripheral range such as $450m\mu-500m\mu$ and $150m\mu-180m\mu$ and the equivalent refractive index N is nearly at $\lambda$.

Figure 7:
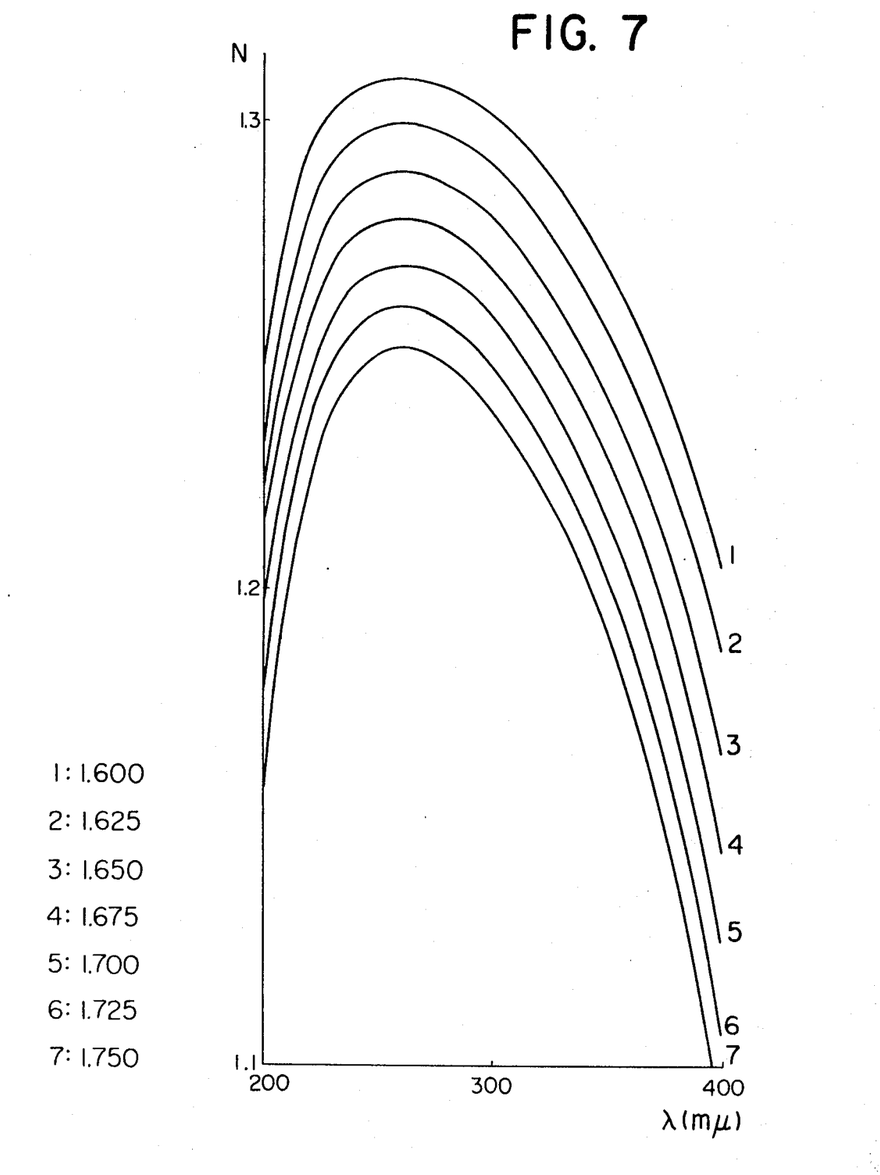

An example of this is shown in FIG. 7. When the symmetric film is considered in the light of the theory of an equivalent film, the refractive index N producing a great dispersion for the peripheral ranges (200–225 $m\mu$ and 350–400 $m\mu$) can be obtained and a refractive index which could never be attained physically before can be attained by a combination of physico-chemically stable surfaces. However, very few substances are physico-chemically stable and transparent in the ultraviolet range. According to the present invention, such limitations are overcome by introducing asymmetry into the refractive index of the symmetric three-layer film. For the sake of convenience, such three-layer film is hereinafter referred to as "pseudo-symmetric three-layer film" and the equivalent refractive index and equivalent film thickness thereof are referred to as "pseudo-equivalent refractive index N*" and "pseudo-equivalent optical thickness N*D* respectively." Let N and ND represent the equivalent refractive index and equivalent optical thickness of the symmetric three-layer film consisting of the first layer ($n_1$, $n_1 d_1$), the second layer ($n_2$, $n_2 d_2$), the third layer ($n_1$, $n_1 d_1$), and let N* and N*D* represent the pseudo-equivalent refractive index and pseudo-equivalent optical thickness of the pseudosymmetric three-layer film consisting of the first layer ($n_1 + \Delta n$, $(n_1 + \Delta n) d_1$) the second layer ($n_2$, $n_2 d_2$) and the third layer ($n_1$, $n_1 d_3$), where $(n_1 + \Delta n) d_1 = n_1 d_3$. Then, these are the following relations:

$$N^* = 1 + \left(\frac{\Delta n}{n_1}\right) N \quad (11)$$

$$\cos \theta^* = \left\{ 1 + \frac{\left(\frac{\Delta n}{n_1}\right)^2}{2\left(1 + \frac{\Delta n}{n_1}\right)} \right\} \cos \theta \quad (12)$$

where $$\theta^* = \pi 2 \frac{ND}{\lambda s} \frac{\lambda s}{\lambda}$$

$$\theta = 2\pi \frac{ND}{\lambda s} \frac{\lambda s}{\lambda}$$

The equation (11) shows that by introducing an asymmetric component $\Delta n$ into the symmetric three-layer film which can provide the equivalent refractive index N, this equivalent refractive index N can be increased or decreased in range by $$\left|\frac{\Delta n}{n_1}\right| \times 100\%$$

for a wavelength range except a stopping band i.e. a wavelength range of $|\cos \theta^*| \leq 1$. For example, if $n_1 = 1.4$ and $\Delta n = 0.05$ the said equivalent refractive index can be increased by 3.5% for each wavelength. The equation (12) shows that when $$\frac{\Delta n}{n_1} < 0.15$$

or so, no contradiction will occur even if it is assumed that the equivalent optical thickness ND is substantially constant for the wavelength range of $|\cos \theta^*| \leq 1$.

In this way, it will be seen that the pseudo-symmetric three-layer film can be a very effective means for attaining a new refractive index and a deviation effect wherein the new refractive index becomes 1.3 - 1.35 for the center of the ultraviolet range (225m$\mu$–350m$\mu$), and less than 1.3 for the peripheral ranges, as shown in FIG. 7, and the great deviation effct could not be attained by any existing substance which is physico-chemically stable and transparent to the ultraviolet range. Also, be developing the abovedescribed theory of pseudo-symmetric three-layer film, it may be assumed that a layer having a refractive index approximate to that of a substrate material (such as rock crystal, fluorspar or the like) is inserted between the pseudo-symmetric three-layer film and the substrate. Such assumption may lead to a concept of pseudo-symmetric three-layer film including the inserted layer. This suggests that an anti-reflection film having the same effect could be realized actually by permuting the substrate material with that layer to thereby reduce the number of layers.

The present invention will become better understood from the following description of embodiments therefore taken in conjunction with the accompanying drawings.

BRIEF DESCRIPTION OF THE DRAWINGS

FIGS. 3, 4, 5 and 6 are vector diagrams representing the reflection factors of a similar single-layer film for the wavelengths of 250 m$\mu$, 300 m$\mu$ and 350 m$\mu$ and 400 m$\mu$, respectively, wherein the thicker lines and the dashed lines are of the same significance as those in FIG. 2, except FIG. 3 which shows no range of refractive index within which the reflection factor becomes less than 2% for 250m$\mu$, whereas FIG. 6 shows that the refractive index of the single-layer film having a thickness of $\lambda$ must be, for example, in the range of about 1.15 to about 1.35 in order to provide a reflection factor less than 2% for the wavelength 400 m$\mu$.

FIG. 7 is a graph relating to a symmetric film $$\frac{\lambda}{4} - \frac{\lambda}{2} - \frac{\lambda}{4}$$

and illustrating the variation in the refractive index $n_2$ of the layer $\lambda/2$ having an equivalent refractive index N, wherein curves 1, 2, 3, 4, 5, 6 and 7 refer to the cases where the refractive index is 1.6, 1.625, 1.65, 1.675, 1.70, 1.725 and 1.75, respectively.

DESCRIPTION OF THE PREFERRED EMBODIMENTS

Various embodiments of the present invention will now be described in detail.

To reproduce a single-layer film whose reflection characteristic is such as is shown in the vector diagrams of FIGS. 2, 3, 4, 5 or 6, substances of low refractive indices such as LiF, cryolite, $MgF_2$ and the like and substances having refractive indices of the order of 1.6 to 1.7 such as $NdF_3$, $LaF_3$ and so forth are combined to form a three-layer film $$\frac{\lambda}{4} - \frac{\lambda}{2} - \frac{\lambda}{4},$$

in the first embodiment of the present invention, which thus comprises a first layer of LiF and $MgF_2$, a second layer of $NdF_3$ or $LaF_3$ and a third layer of cryolite. Also, while the material compositions of the first and third layers may differ, the necessary differences in refractive characteristics can be effected by changing the vacuum evaporation methods used for those layers. By doing so, a refractive index of 1.1 to 1.3 can be obtained as the equivalent refractive index N, of such film. (FIG. 7 is an example of the equivalent refractive index obtained by the refractive indices of 1.4- about 1.6-1.4.)

Figure 3:
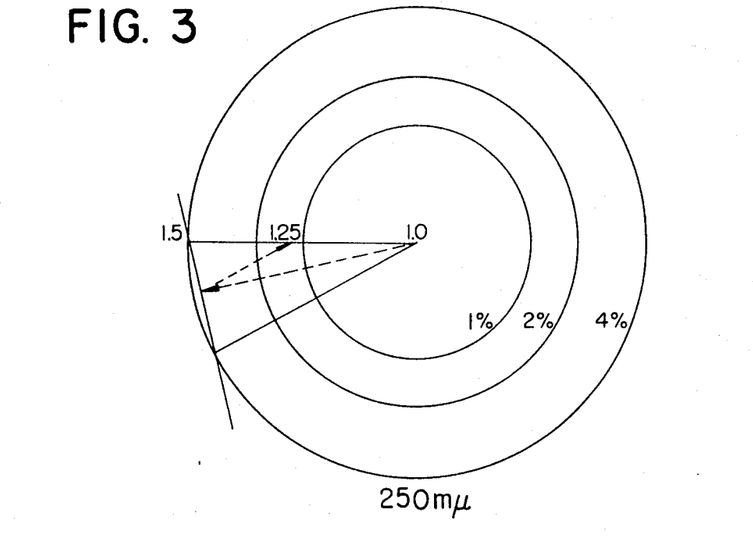
Figure 4:
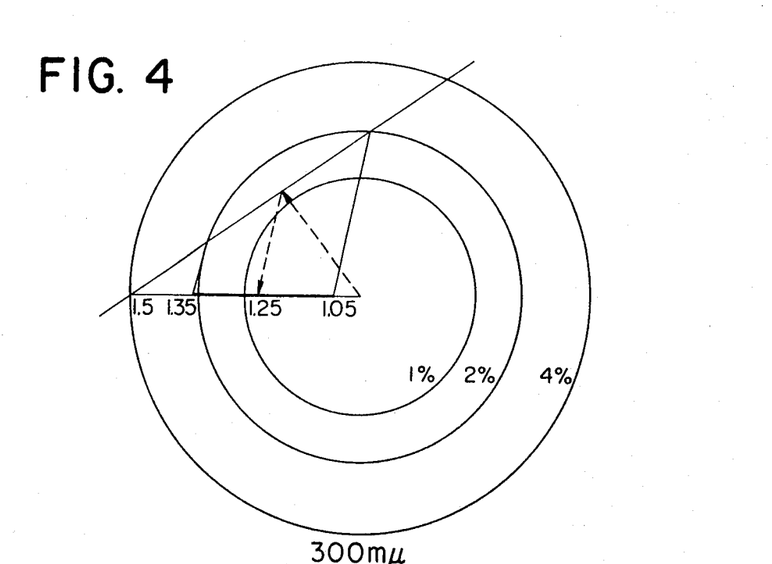
Figure 5:
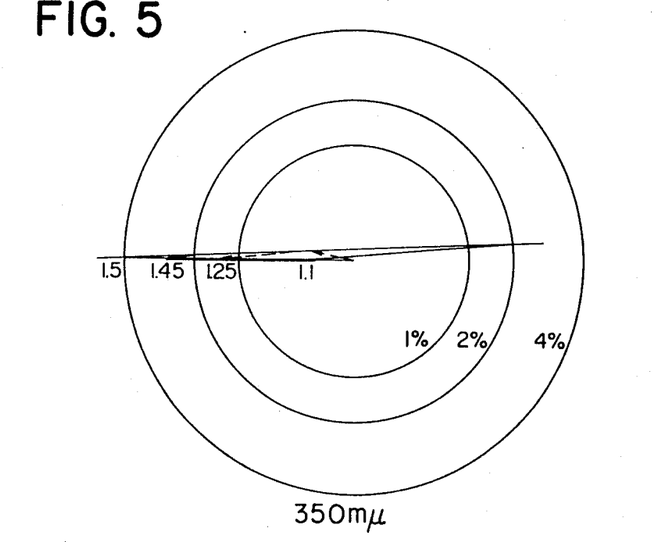
Figure 6:
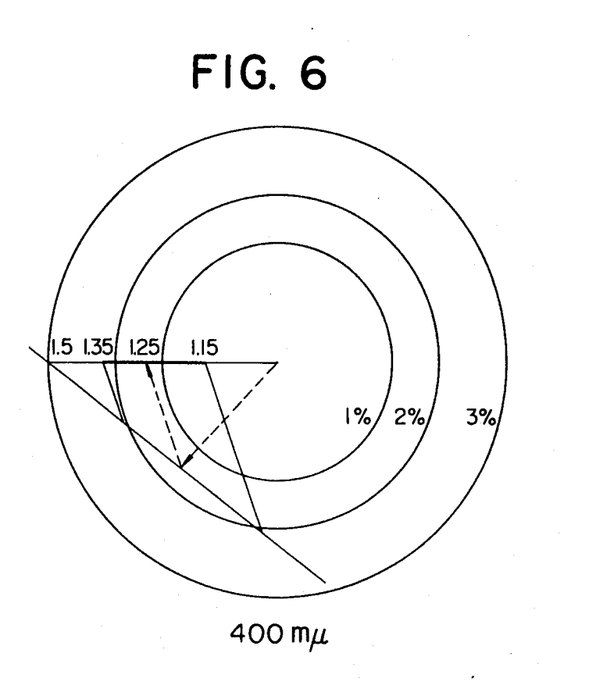

However, it will be seen from FIG. 3 that little or no anti-reflection effect can be attained for the range in the vicinity of the center wavelength.

By introducing an asymmetric component into such symmetric three-layer film, i.e. by establishing the relation that $$\left|\frac{\Delta n}{n_1}\right| \times 100\% = 3.5\% - 4\%,$$

where $\Delta n = 0.05$–$0.07$, the
following merits can be obtained:

1. The best refractive index (pseudo-equivalent refractive index) can be attained for the ultra-violet range from $200m\mu - 400m\mu$, whereby the reflection factor can be made uniform except for the center wavelength range which is the range expressed as:
$|\cos\theta^*| \leq 1$ where $|\cos\theta^*| = \left(1 + \frac{\left(\frac{\Delta n}{n_1}\right)^2}{2\left(\frac{\Delta n}{n_1}\right)}\cos\theta\right)$ 2. The range expressed as $|\cos\theta^*| \geq 1$ cannot be permuted by a pseudo-equivalent film but in this range the pseudo symmetric three-layer film is not made into an absent layer. However, the second layer of the pseudo symmetrical three-layer is made into an abscent layer so that it is possible to maintain an anti-reflection effect for the range in the vicinity of the center wavelength substantially in the form of two-layer film $$\frac{\lambda}{4} - \frac{\lambda}{4}.$$

Figures 9A, 12:
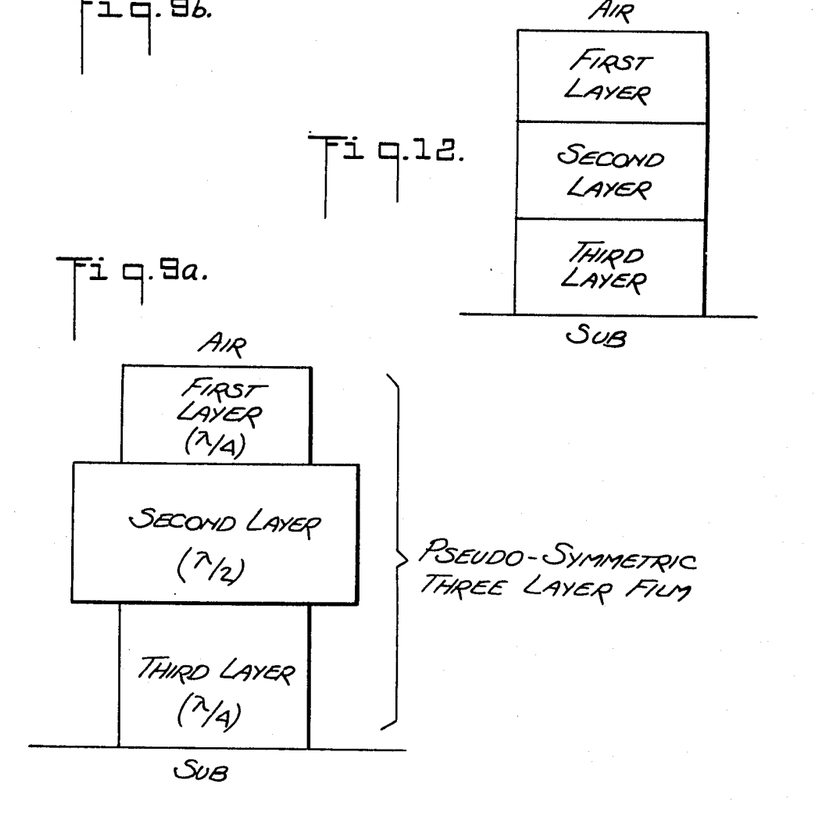
FIGS. 9a, 9b, 10a, 10b, 10c and 12 are block diagrams illustrating the constructions of the anti-reflection films according to different embodiments of the present invention.

FIG. 9a shows an antireflection film of the first embodiment of the invention comprising a pseudo symmetric three-layer film in which an asymmetric component ($\Delta n$) is introduced.

In the first embodiment, the first layer is formed of $MgF_2$, LiF or CaF, the second layer formed of fluorides such as $NdF_3$, $LaF_3$ and the like and the third layer formed of cryolite. In this case the refractive index of the first layer and the substrate must be the same. The third layer of the first embodiment is permuted by substrate materials and it will scarcely lose its characteristic and will still provide an anti-reflection film whose reflection factor is less then 2% for the ultraviolet range (200–400m$\mu$).

Figure 9B:
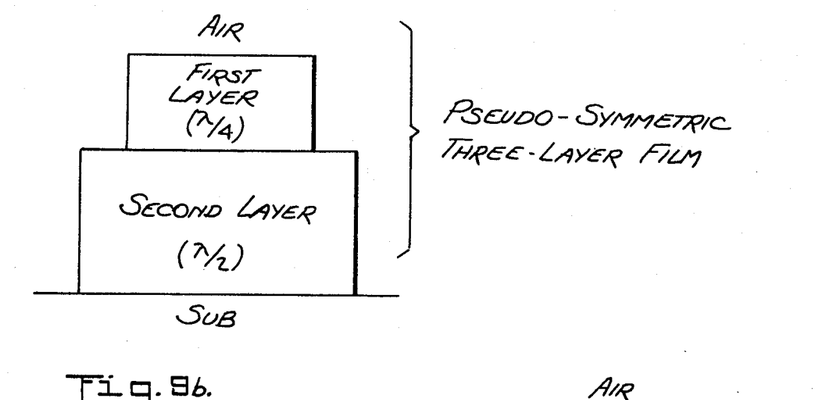

The second embodiment as shown in FIG. 9b is of such a construction:

$$n_s - \frac{\lambda}{2} - \frac{\lambda}{4} - \text{air} \quad (T-1)$$

In the second embodiment, the substrate forms the third layer of the pseudo-symmetric three layer film of the first embodiment. Therefore, the number of layers in the second embodiment is reduced from that of the first embodiment, while substantially the same effect can be attained. If the first layer in the second embodiment is formed of $MgF_2$, cryolite, LiF and $CaF_2$ and the second layer is formed of fluorides such as $NdF_3$, $LaF_3$ and the like, while the substrate material is formed of a substance which has a refractive index of 1.5 or less and is transparent, then absorption may be substantially negligible in the film thickness like that of the present embodiment. Further, these fluorides, unlike oxides such as $Al_2O_3$ and $SiO_2$, present no remarkable difference between a composition of the bulk subjected to thermal cracking during the evaporation and a composition of the film produced by the evaporation and is very excellent in reproducibility. Such excellent reproducibility leads to a merit that control of the film thickness can be stabilized. More specifically, in controlling the film thickness, the use of ultraviolet rays to measure the reflection factor or the transmission index will involve difficulties concerning the optical system, the filter or the photometric system. To eliminate such inconveniences, visible rays will be used to control the layers $\lambda/2$ and $\lambda/4$ for the ultraviolet range. This means that the problem of controlling the layers $\lambda/2$ and $\lambda/4$ for the ultraviolet range is permuted by the problem of controlling the layers $\lambda/4$ and $\lambda/8$ for certain wavelengths in the visible range. Thus, $$\frac{\lambda_u}{4} = \frac{\lambda_r}{4} \cdot \frac{\lambda_u}{\lambda_v} \simeq \frac{\lambda_r}{8} \quad (14)$$

$$\frac{\lambda_u}{2} = \frac{\lambda_r}{2} \cdot \frac{\lambda_u}{\lambda_v} \simeq \frac{\lambda_v}{4} \quad (15)$$

where $$\frac{\lambda_u}{\lambda_r} \simeq \frac{1}{2}$$

Figure 8:
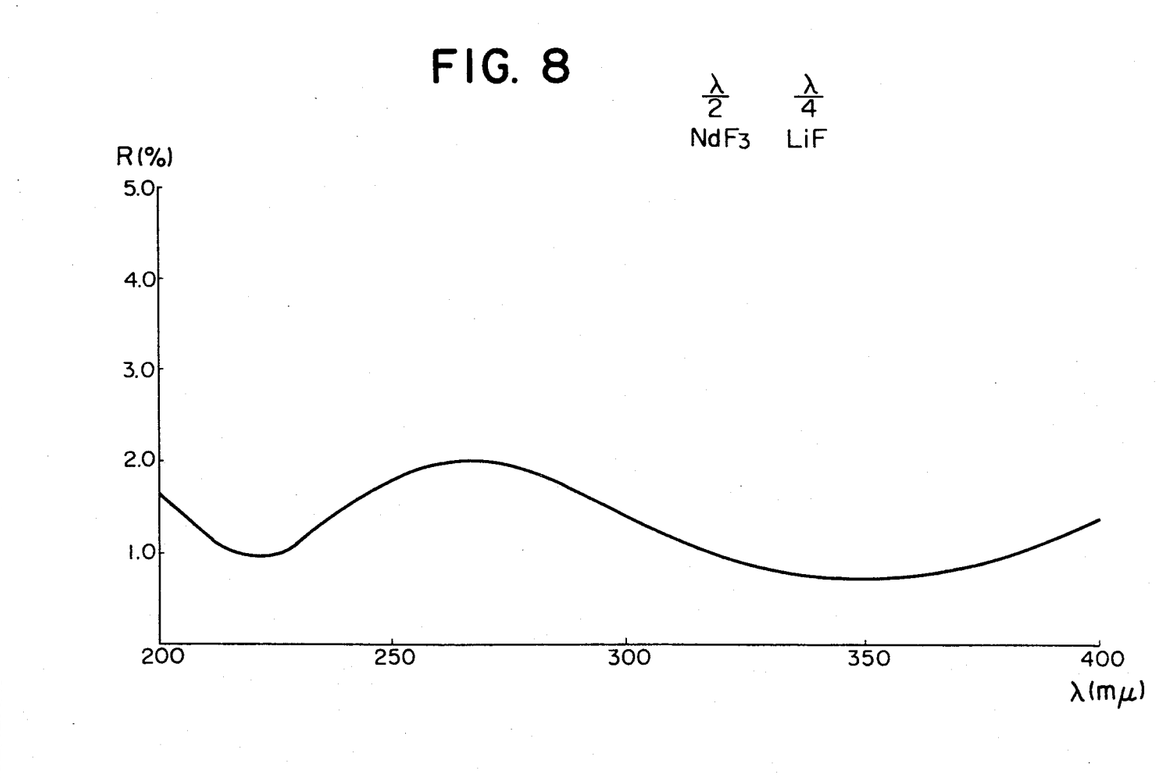
FIGS. 8, 11 and 13 are graphs illustrating the spectral characteristics of three of the described embodiments.

Accordingly, it will be seen that controlling the layer $m\lambda/2$ by a suitable wavelength in the ultraviolet range (in the present embodiment, it is 260 m$\mu$) means controlling the film thickness readily by finding out the layer $m\lambda/4$ in the visible range, namely, the extreme value of the reflection factor. However, according to the described method, controlling the layer $\lambda/4$ in the ultraviolet range is difficult to do, and in this case, the refractive index should be previously determined and the reflective factor for any desired film thickness be calculated from the predetermined refractive index so as to control its value. Needless to say, stability of the refractive index leads to stability of the film thickness control. The present embodiment thus provided is a multilayer anti-reflection film of excellent reproducibility and stability, together with other merits such as the ready evaporation of fluorides during the manufacturing process, the chemical properties of the evaporated film which is well resistive to water and chemicals, and the physical properties including good durability and wear-proof. The spectral characteristic and construction of the second embodiment are shown in FIGS. 8 and 9b, respectively.

Figures 10A, 10B, 10C:
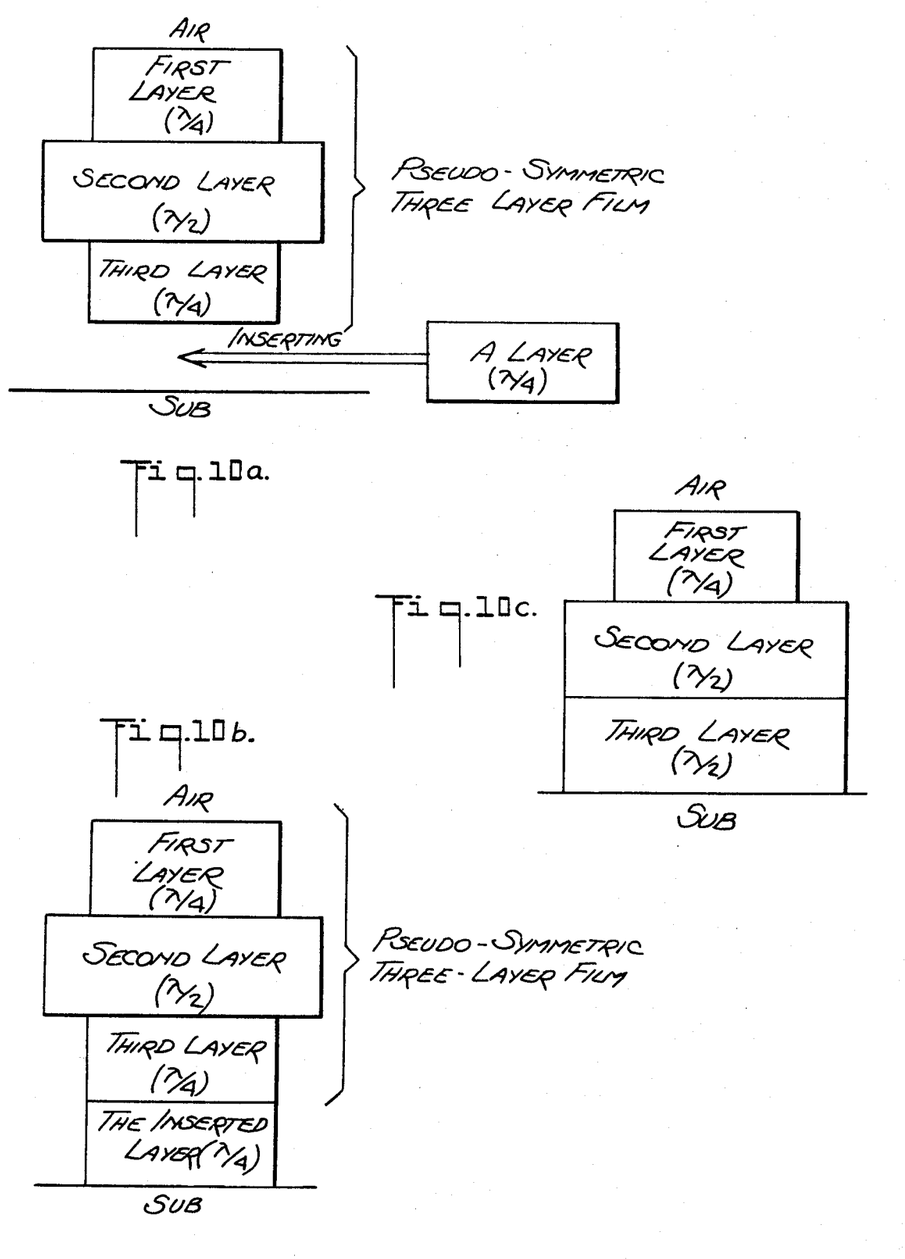

According to a third embodiment of the present invention shown in FIG. 10b, a layer is inserted between the substrate layer and the pseudo-symmetric three-layer film as illustrated in FIG. 10a, so that the substrate layer may be made for most favorable condition for the pseudo-symmetric three-layer film (which consists of a first or air-adjacent layer λ/4 formed of $MgF_2$ and the like, a second layer λ/2 formed of $LaF_3$, $NdF_3$ and the like, and a third layer λ/4 formed of LiF, cryolite and the like). Let $n$ and $nd/\lambda_s$ be the refractive index and film thickness of the inserted layer, respectively. Then for a wavelength $\lambda_0$ which is $$\frac{nd}{\lambda_s} \cdot \frac{\lambda s}{\lambda_0} = \frac{1}{4},$$

the refractive index ($n_s$) of the substrate is corrected by the refractive index $\bar{n}_0$ which is expressed by the following equation:

$$\bar{n}_0 = \frac{n^2}{n_s} \qquad (16)$$

It is assumed that when $\lambda_0 = \lambda_s$, the refractive index of the substrate layer for the ultraviolet range will be equivalent to $n\lambda'$. Then, $n\lambda'$ and $\bar{n}_0$ are in the following relation:

$$\left(\frac{n\lambda'-1}{n\lambda'+1}\right)2 \simeq \left(\frac{\bar{n}_0-1}{\bar{n}_0+1}\right)2 + \frac{K}{a^2+K} \qquad (17)$$

where $$a = n \frac{n_s}{n} \qquad (18)$$

$$K = (n^2 - 1)(n_s^2 - n^2) \frac{1}{n^2} \cos^2 G \qquad (19)$$

$$\underline{G} = 2\pi \frac{nd}{\lambda s} \frac{\lambda_s}{\lambda} \qquad (20)$$

Thus, by suitably inserting the layer λ/4 between the substrate and the pseudo-symmetric three-layer portion, the substrate materials and the inserted layer λ/4 provide an effect as a new substrate having a refractive index substantially equivalent to $n^2/n_s$, and it will be seen from equation (17) that such refractive index provides dispersion in the peripheral range (200 mμ–225mμ and 350mμ–400mμ).

The third embodiment as illustrated in FIG. 10b is an example in which a layer λ/4 having a refractive index substantially equal to the third of the pseudo-symmetric layers provided in the described manner is inserted between the substrate and the pseudo-symmetric three-layer film (as shown in FIG. 10a) to correct the refractive index of the substrate and improve the spectral characteristic for the entire wavelenth range. That is to say, the third embodiment has the following construction:

$$n_s - \frac{\lambda}{4} - \frac{\lambda}{4} - \frac{\lambda}{2} - \frac{\lambda}{4} - \text{air} \qquad (T-2')$$

In a fourth embodiment, as illustrated in FIG. 10c, a layer λ/2, adjacent to the substrate is substituted for the third and fourth layers λ/4, λ/4, of the third embodiment (T - 2') so that the construction is as follows:

$$n_s - \frac{\lambda}{2} - \frac{\lambda}{2} - \frac{\lambda}{4} - \text{air} \qquad (T-2)$$

In the fourth embodiment satisfying (T - 2), the first layer adjacent to air is formed of fluorides of low refractive indices such as cryolite, $CaF_2$, $MgF_2$ and the like, the second layer is formed of fluorides such as $LaF_3$ and $NdF_3$ whose refractive indices are of the order of 1.6, and the third layer λ/2 adjacent to the substrate is formed of fluorides such as LiF and the like whose refractive indices are slightly lower than that of the substrate. Thus, the fourth embodiment provides a multilayer anti-refraction film of excellent stability and good reproducibility whose reflection factor is only below about 1% to about 1.5% for the ultraviolet range (200 - 400 mμ).

Figure 11:
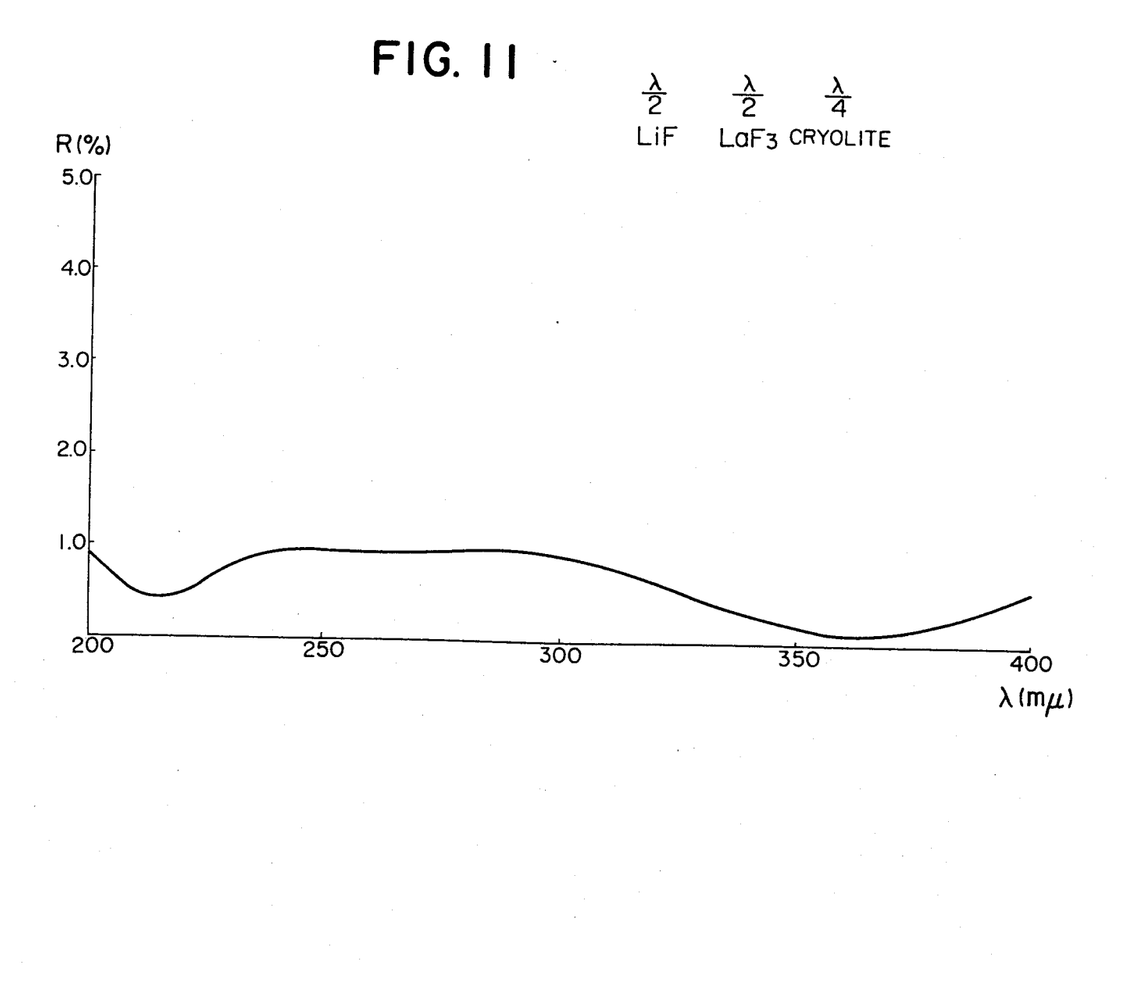

The spectral characteristic and construction of the fourth embodiment are illustrated in FIGS. 11 and 10c respectively.

According to a fifth embodiment of the present invention as shown in FIG. 12, an optimum refractive index of a suitable single layer ¾λ is obtained by seeking the most favorable anti-reflection film by the vector method in the same manner as described with respect to the first embodiment. Then, a pseudo-symmetric three-layer film satisfying such refractive index is obtained. The first layer λ/4 adjacent to air in the first embodiment is formed of LiF, cryolite $MgF_2$ and $CaF_2$, the second layer λ/4 is formed of $LaF_3$, $NdF_3$ and like substances, and a layer λ/4 whose refractive index has a suitable value between the refractive indices of the first and second layers is used as the third layer. For instance, the third layer is formed of $TaF_3$ and the like, the result is a physico-chemically stable multilayer anti-reflection film of excellent reproducibility.

Figure 13:
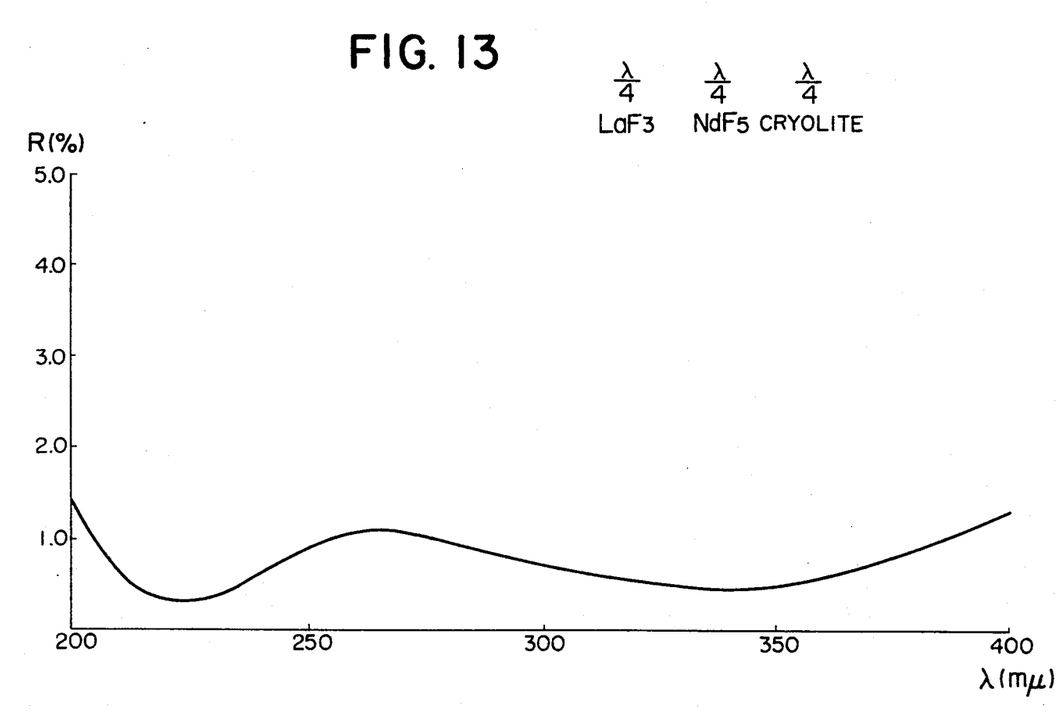

The construction and spectral characteristic of the fifth embodiment are illustrated in FIGS. 12 and 13, respectively, the construction is as follows:

$$n_s - \frac{\lambda}{4} - \frac{\lambda}{4} - \frac{\lambda}{4} - \text{air} \qquad (T-3).$$

We claim:
1. An anti-reflection film for ultraviolet rays comprising:
a substrate having a refractive index in the range of 1.6–1.4 and being transparent to the ultraviolet range; and a three-layer film consisting of
a. a first-layer having a refractive index $n_1$ in the range of 1.3–1.5 and an optical thickness $n_1 d_3$ and being adjacent to air, where $d_3$ is a physical thickness of the first layer,
b. a second layer adjacent to said first layer and having a refractive index $n_2$ in the range of

1.6–1.7 and an optical thickness $n_2d_2$, where $d_2$ is a physical thickness of the second layer, and c. a third layer disposed between said substrate and said second layer and having a refractive index $(n_1 + \Delta n)$ and an optical thickness $(n_1 + \Delta n)d_1$, wherein $\Delta n$ has the relation:

$$\left|\frac{\Delta_n}{n_1}\right| < 0.1,$$

$n_1 d_3 = (n_1 + \Delta n)d_1$, and
$\Delta n > 0$, and $d_1$ is a physical thickness of the third layer, said optical thickness of said three layers satisfying the following relation:

$$\frac{n_1 d_3}{\lambda_s} + \frac{(n_1 + \Delta n)d_1}{\lambda_s} = \frac{n_2 d_2}{\lambda_s} = \frac{m}{2} = 2\alpha$$

where $\lambda s$ is the center wavelength within the ultraviolet range and m is integer (1, 2, 3 .........), and the following relation:

$$|\cos G| \simeq \sqrt{n_1/(n_1+n_2)}$$

where $$G = 2\pi \alpha \cdot \frac{\lambda_s}{\lambda},$$

and $\lambda$ is a specific wavelength in the far peripheral range of 450m$\mu$–500m$\mu$ or 150m$\mu$–180m$\mu$, wherein an equivalent refractive index N of said three-layer film is in the range of 1.35–1.3 for the central ultraviolet range (225m$\mu$–350m$\mu$), less than 1.3 for the peripheral range (200m$\mu$–225m$\mu$ and 350m$\mu$–400m$\mu$) and nearly zero at the specific wavelength $\lambda$.

2. An anti-reflection film according to claim 1, wherein the first layer of said three-layer film is made of a material selected from the group consisting of MgF$_2$ and LiF; the second layer is made of a fluoride selected from the group consisting of NdF$_3$ and LaF$_3$; the third layer is made of cryolite; and the substrate is made of a material selected from the group consisting of CaF$_2$ and Silica glass.

3. An anti-reflection film according to claim 1, wherein a fourth layer having an optical film thickness $\lambda s/4$ is inserted between said third layer and said substrate for correcting the refractive index of said substrate.

4. An anti-reflection film for comprising a substrate having a refractive index of 1.6–1.4 and being transparent to ultraviolet rays; and a three-layer film consisting of a. a first-layer being adjacent to air, and having a refractive index $n_1$ in the range 1.3–1.5 and optical index thickness $n_1d_3$, where $d_3$ is a physical thickness of the first layer, b. a second layer being adjacent to said first layer and having a refractive index $n_2$ in the range 1.6–1.7 and an optical thickness $n_2d_2$, where $d_2$ is a physical thickness of the second layer, and c. a third layer disposed between said substrate and said second layer and having a refractive index $(n_1 + \Delta n)$ and an optical thickness $(n_1 + \Delta n)d_1$, where $\Delta n$ satisfies the relation $$\left|\frac{\Delta n}{n_1}\right| < 0.1,$$

$n_1 d_3 = (n_1 + \Delta n)d_1$ and $\Delta n \neq 0$, and
$d_1$ is an optical thickness of the third layer, each layer of said three-layer film satisfying the following relation:

$$\frac{n_1 d_3}{\lambda_s} = \frac{(n_1+\Delta n)d_1}{\lambda_s} = \frac{n_2 d_2}{\lambda_s} = \frac{m}{4} = \alpha$$

where $\lambda s$ is the central wavelength within the ultra-violet range, m is an integer, and the following relation:

$$|\cos G| \simeq \sqrt{n_1/(n_1+n_2)}$$

where $$G = 2\pi \alpha \cdot \frac{\lambda_s}{\lambda}.$$

$\lambda$ is a specific wavelength in the far peripheral range of 450m$\mu$–500m$\mu$ and 150m$\mu$–180m$\mu$, and wherein an equivalent refractive index N of said three-layer film is in the range of 1.35–1.3 for the central ultraviolet range (225m$\mu$–350m$\mu$) and less than 1.3 in the peripheral range (200m$\mu$–225m$\mu$ and 350m$\mu$–400m$\mu$) and nearly zero at the specific wavelength $\lambda$.

5. An anti-reflection film according to claim 4, wherein the optical thickness $n_1d_3$, $n_2d_2$, $(n_1 + \Delta n)d_1$ of said first, second and third layers are $\lambda s/4$, respectively.

6. An anti-reflection film according to claim 5, wherein said first layer is made of a material selected from the group consisting of LiF, cryolite, MgF$_2$ and CaF$_2$; said second layer is made of a fluoride selected from the group consisting of LaF$_3$ and NdF$_3$; said third layer is made of ThF$_3$.

7. An anti-reflection film for ultraviolet rays comprising:

a first layer having a refractive index $n_1$ in the range 1.3–1.5 and an optical thickness $n_1d_1$ equal to $\lambda s/4$, where $d_1$ is a physical thickness of the first layer and $\lambda s$ is the center wavelength within the ultraviolet range, a second layer adjacent said first layer and having a refractive index $n_2$ in the range 1.6–1.7 and an optical thickness $n_2d_2$ equal to $\lambda s/2$, where $d_2$ is a physical thickness of the second layer, a substrate adjacent to said second layer and having a refractive index equal to $n_1$, wherein the optical film thickness satisfy the relation:

$$\frac{n_1d_1}{\lambda_s} + \frac{n_1d_1}{\lambda_s} = \frac{n_2d_2}{\lambda_s} = 2\alpha,$$

$$|\cos G| \simeq \sqrt{n_1/(n_1+n_2)}$$

where $$G = 2\pi\alpha \frac{\lambda_s}{\lambda},$$

and $\lambda$ is a specific wavelength in the peripheral range of 450m$\mu$ – 550m$\mu$ and 150m$\mu$ – 180m$\mu$, wherein an equivalent refractive index N of said anti-reflection film is in the range of 1.35–1.3 for the central ultraviolet range (225m$\mu$–350m$\mu$) and less than 1.3 for the peripheral range (200m$\mu$–225m$\mu$ and 350mμ–400mμ), and nearly zero at the specific wavelength λ.

* * * * *

UNITED STATES PATENT OFFICE
CERTIFICATE OF CORRECTION

Patent No. 3,936,136        Dated February 3, 1976

Inventor(s) HIDEO IKEDA, et al.

It is certified that error appears in the above-identified patent and that said Letters Patent are hereby corrected as shown below:

Column 1, line 19, change "suubstances" to -- substances --; line 49, change "range of" to -- range and --.

Column 2, line 58, change ">>" to -- << --.

Column 3, line 27 approximately, change the formula reading "$\Delta ND= 2- n_2/n_1 + n_1/n_2 \sin 2G_1 \sin G_2$" to read -- $\Delta ND= [2-(n_2/n_1 + n_1/n_2)] \sin 2G_1 \sin G_2$ (7) --; line 47, change that portion of the formula reading "$N(\lambda)**$" to read -- $N(\lambda) \simeq$ --;

Column 4, line 1, before that portion of the formula reading "$n_1 d_1/\lambda_S$" insert -- a) when --; same line, after "$\alpha$" insert -- and --; line 11, insert -- then -- before that portion of the formula reading "$|\cos G|$"; line 13, before that portion of the formula reading "$2 n_1 d_1/\lambda_S$" insert -- b) when --; same line, after "$\alpha$" insert -- and --; lines 14,15,16, delete "C-U- Z,-"; line 18, delete "12"; line 27 approximately, delete "(7)"; line 34, insert -- then -- before "$|\cos G|$"; line 39, before that portion of the formula reading "$n_1 d_1/\lambda_S$" insert -- (c) when --; same line, after "$\alpha$" insert -- and --; line 52, after that portion of the formula reading "$\lambda s/\lambda$" insert -- and --.

Column 5, line 1, change "layerr" to -- layer --; line 18, change "$N \simeq$" to -- $N* \simeq$ --;

Column 7, lines 40 to 43, change that portion of the formula reading "$\cos\theta)$" to read -- $)\cos\theta$ --.

Column 12, line 19, after "$|\cos G|$" insert -- $\simeq$ --; line 53, change "thickness" to -- thicknesses --.

Signed and Sealed this

Fourteenth Day of September 1976

[SEAL]

Attest:

RUTH C. MASON
Attesting Officer

C. MARSHALL DANN
Commissioner of Patents and Trademarks